(12) United States Patent
Huang

(10) Patent No.: US 7,034,762 B2
(45) Date of Patent: Apr. 25, 2006

(54) SLOT ANTENNA FOR PORTABLE WIRELESS COMMUNICATION DEVICES

(75) Inventor: Chi-Fang Huang, Taipei (TW)

(73) Assignee: Tatung Co., (TW)

( * ) Notice: Subject to any disclaimer, the term of this patent is extended or adjusted under 35 U.S.C. 154(b) by 8 days.

(21) Appl. No.: 10/866,772

(22) Filed: Jun. 15, 2004

(65) Prior Publication Data
US 2005/0017914 A1    Jan. 27, 2005

(30) Foreign Application Priority Data
Jul. 21, 2003    (TW) ................................ 92119787 A

(51) Int. Cl.
*H01Q 13/10* (2006.01)
(52) U.S. Cl. ................ 343/767; 343/702; 343/770
(58) Field of Classification Search ................ 343/702, 343/767, 770
See application file for complete search history.

(56) References Cited

U.S. PATENT DOCUMENTS

| | | | | |
|---|---|---|---|---|
| 5,677,698 A * | 10/1997 | Snowdon | ..................... | 343/770 |
| 6,507,322 B1 * | 1/2003 | Fang et al. | ................. | 343/770 |
| 6,653,983 B1 * | 11/2003 | Masuda et al. | ............. | 343/767 |
| 6,853,336 B1 * | 2/2005 | Asano et al. | ............... | 343/702 |
| 6,879,293 B1 * | 4/2005 | Sato | ........................... | 343/702 |
| 2002/0027528 A1 * | 3/2002 | Okabe et al. | ............... | 343/702 |
| 2003/0222823 A1 * | 12/2003 | Flint et al. | ................... | 343/702 |
| 2005/0146475 A1 * | 7/2005 | Bettner et al. | ............. | 343/767 |

* cited by examiner

*Primary Examiner*—Tan Ho
(74) *Attorney, Agent, or Firm*—Bacon & Thomas, PLLC

(57) ABSTRACT

A slot antenna for a portable wireless communication device hides the antenna, which is integrated with the portable wireless communication device. The slot antenna has good communication capabilities, and causes no additional electromagnetic interference to the portable wireless communication device. The slot antenna has multi-polarization capabilities, which can provide better communication functionality.

13 Claims, 3 Drawing Sheets

SLOT ANTENNA FOR PORTABLE WIRELESS COMMUNICATION DEVICES

BACKGROUND OF THE INVENTION

1. Field of the Invention

The present invention relates to a slot antenna and, more particularly, to a slot antenna for portable wireless communication devices.

2. Description of the Related Art

Tablet PCs and notebook computers not only have the computational power of desktop computers, but also are much smaller than desktop computers. With improvements of wireless communication technology, many users have begun to use wireless data transmission to achieve better mobile functionality. As shown in FIG. 1, a tablet computer 10 has a wireless module 12. When a user uses the wireless module 12 to connect the tablet computer 10 to a wireless network, to obtain good communication and increase the sending/receiving data rate, the wireless module 12 must employ a monopole antenna 14. However, the monopole antenna 14 has a fragile structure and large dimensions. Consequently, some tablet computers 10 employ a smaller antenna, such as an inverted-F antenna or a microstrip antenna. However, the housing of the tablet computer 10 is usually made of metalic materials. When the antenna 14 is mounted inside the tablet computer 10, it is difficult for the wireless module 12 to transmit or receive signals, and the signal radiation can cause electronic interference to other elements inside the tablet computer 10 as well.

Therefore, it is desirable to provide a slot antenna for portable wireless communication devices to mitigate and/or obviate the aforementioned problems.

SUMMARY OF THE INVENTION

A main objective of the present invention is to provide a slot antenna for portable wireless communication devices which can improve wireless communication abilities.

Another objective of the present invention is to provide a slot antenna for portable wireless communication devices which takes diffraction caused by the portable wireless communication device into account in the design of an antenna radiation field.

Another objective of the present invention is to provide a slot antenna for portable wireless communication devices which can reduce the manufacturing costs of the antenna.

Another objective of the present invention is to provide a slot antenna which transmits and receives electromagnetic wave without cutting off the mechanical enclosure of a portable wireless communication device that is compliant its electromagnetic interface design.

In order to achieve the above-mentioned objectives the slot antenna for portable wireless communication devices includes: at least one metallic resonating chamber, having at least one first slot on at least one side; at least one feeding wire, installed on a side of the metal resonating chamber; at least one excitation section, placed in the metal resonating chamber and connected to the at least one feeding wire; and the portable wireless communication device having at least one second slot on at least one side; wherein the metal resonant chamber is located in the portable wireless communication device and the at least one first slot is coupled to the at least one second slot.

Since the design of the slot antenna considers the diffraction effect of the computer body, the slot antenna can provide good wireless communications. Furthermore, the slot antenna and a casing of the computer body can be made together to reduce the manufacturing costs. Moreover, the resonating chamber can prevent the slot antenna from electromagnetic interference generated by the other circuits inside portable wireless communications device.

Other objectives, advantages, and novel features of the invention will become more apparent from the following detailed description, when taken in conjunction with the accompanying drawings.

DETAILED DESCRIPTION OF THE PREFERRED EMBODIMENT

Figure 1:
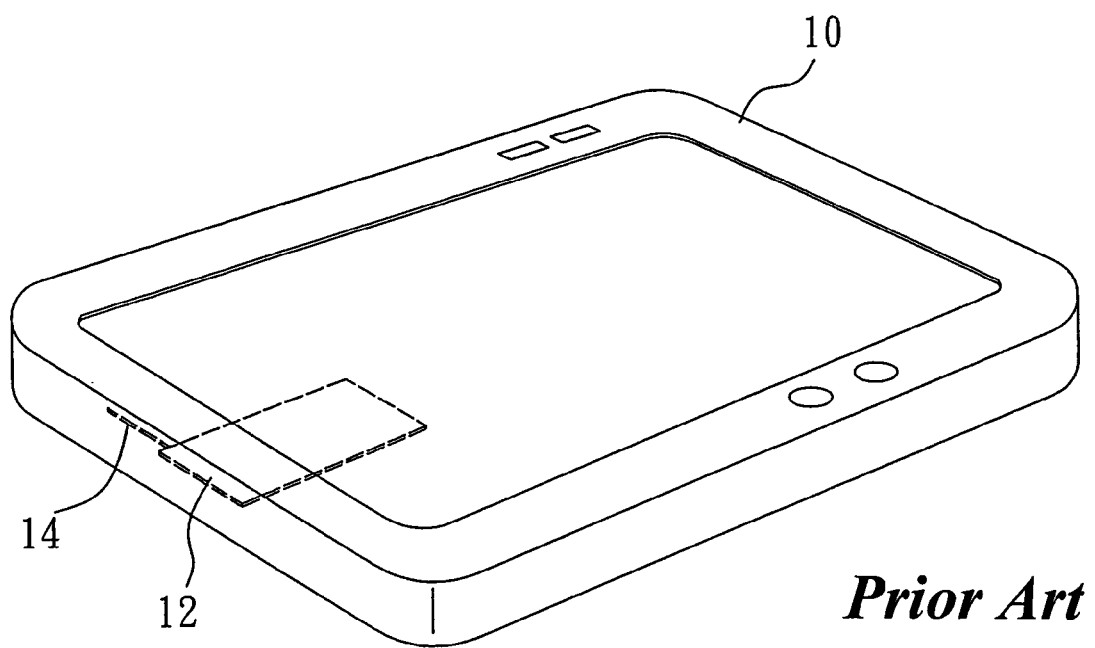
FIG. 1 is a schematic drawing of a prior art antenna used in a portable wireless communications device.
Figure 2:
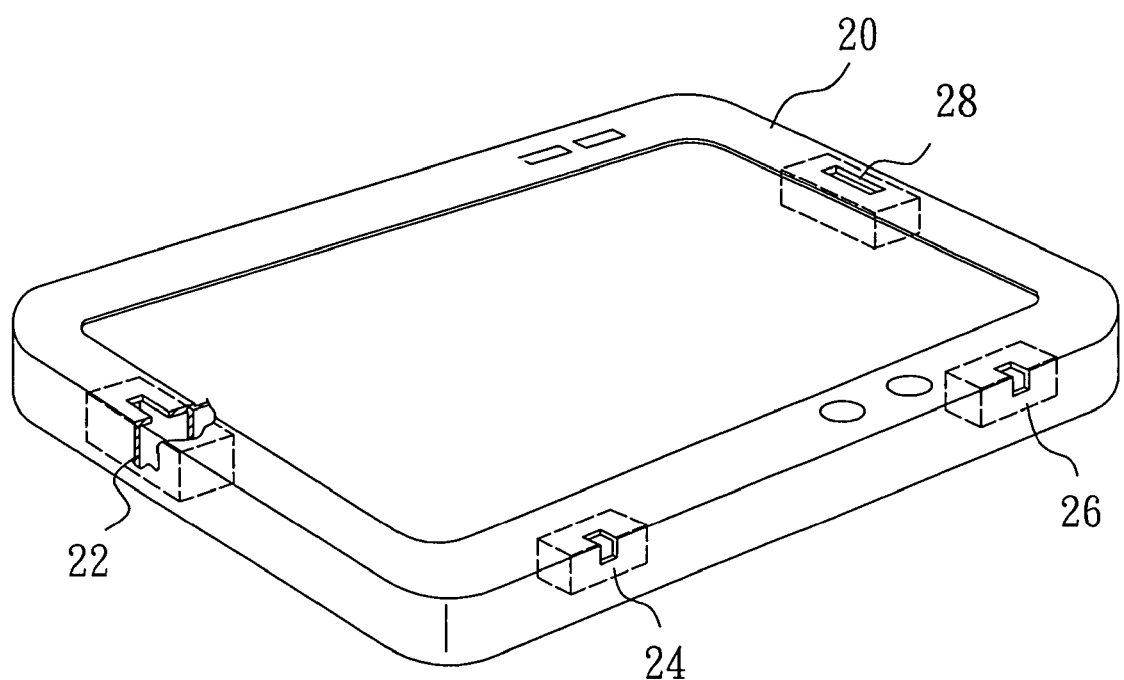
FIG. 2 is a schematic drawing of a slot antenna used in a portable wireless communications device according to the present invention.

Please refer to FIG. 2. FIG. 2 is a schematic drawing of a slot antenna used in a portable wireless communications device according to the present invention. Several slot antennas 22, 24, 26 and 28 may be installed in the tablet computer 20. The slot antennas 22, 28 are identical to each other, and are mounted on opposite sides of the tablet computer 20; they both receive and transmit wireless data signals (communication signals) from two sides of the tablet computer 20 to achieve a spatial diversity effect. Furthermore, the slot antennas 24, 26 both have slots in two directions for receiving and transmitting wireless data signal horizontally and vertically to achieve a polarized diversity effect. Due to the huge body in terms of operating 5 wavelength, the tablet computer 20 has its own diffraction effect. As the slot antennas 22, 24, 26 and 28 are designed to be mounted in the tablet computer 20, the diffraction effect of the tablet computer 20 is taken into consideration in the design of radiation field of the slot antennas 22, 24, 26 and 28.

Figure 3:
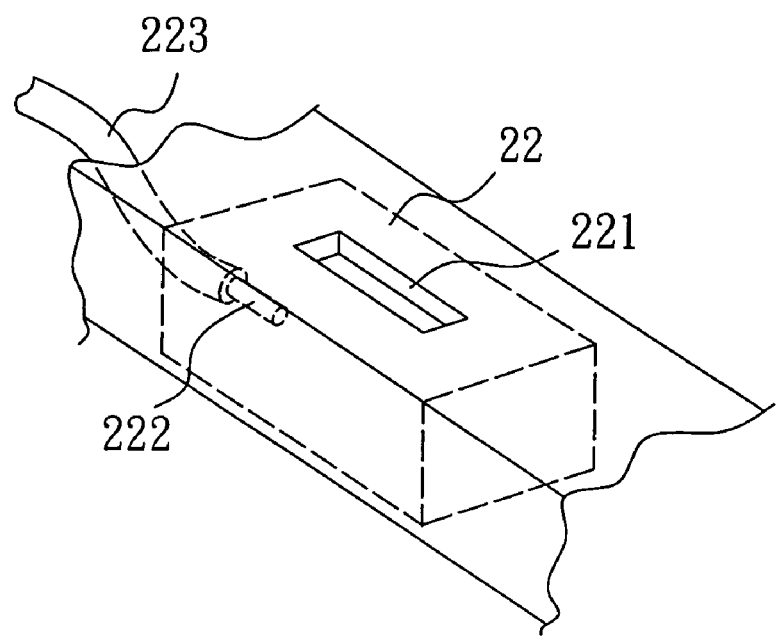
FIG. 3 is a structure drawing of the slot antenna used in a portable wireless communications device according to the present invention.

FIG. 3 is a structure drawing of the slot antenna used in the portable wireless communication device according to the present invention. As shown in FIG. 3, a chamber body of the slot antenna 22 is made of metal and a resonating chamber is formed inside thereof, and the resonating chamber can provide different resonance by adjusting the size of the chamber body to satisfy different working frequencies (communication signals) for the slot antenna 22. The internal surface of the resonant chamber may be made from material with high dielectric constants, such as ceramics, so as to provide better resonance results, and the dimensions of the slot antenna 22 can be reduced.

At least one slot (e.g. slot 221) can be placed on the chamber body of the slot antenna 22. The opening direction decides the radiation polarization direction of the slot antenna. For example, when the opening direction of the slot 221 is in a perpendicular direction, the radiation polarization direction of the slot antenna 22 is in one certain direction, and vice versa. Of course, the opening direction of the slot 221 can be in other directions.}

One end of a feeding wire 223 is connected to a built-in wireless module (not shown) and the other end is connected to an excitation section 222. Therefore, the communication signals from the built-in wireless module can be sent to the excitation section 222 via the feeding wire 223 for distant transmission, and the distant communication signals can be delivered into the built-in wireless module via the feeding wire 223. The feeding wire 223 is coupled (wedged or locked) to one side of the slot antenna 22. The excitation section 222 is located inside the slot antenna 22 and connected to the feeding wire 223. The excitation section 222 is preferable made of metal, and part of the feeding wire 223. The length of the excitation section 222 is preferable no longer than one quarter of the wavelength of the communication signal, so does the slot 221.

Figure 4:
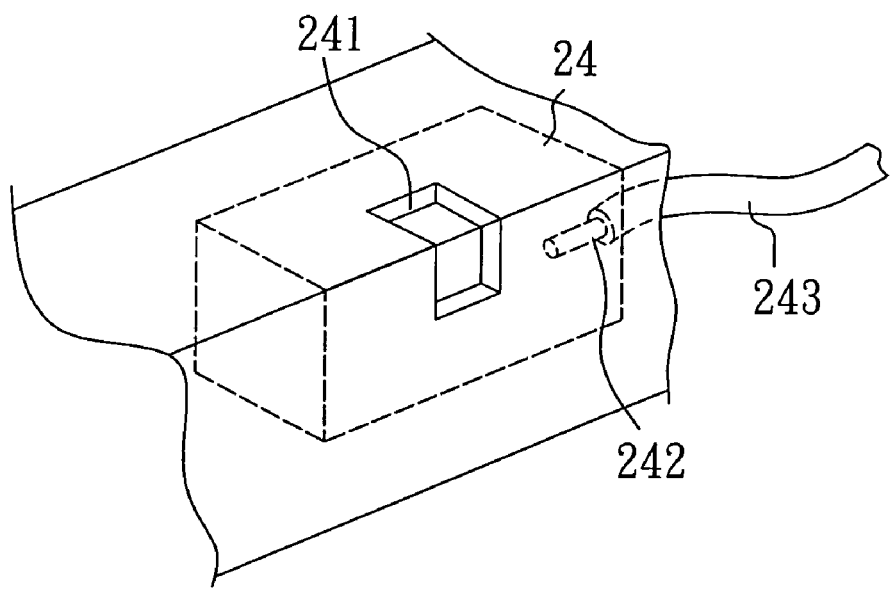
FIG. 4 is a schematic drawing of another slot antenna used in a portable wireless communications device according to the present invention.

Please refer to FIG. 4. FIG. 4 is a schematic drawing of another slot antenna used in the portable wireless communication device according to the present invention. The slot antennas 22, 24, 26 and 28 have similar capabilities and characteristics, but have different opening directions.

The slot antennas 22, 24, 26 and 28 can be integrated into the mechanism of the tablet computer 20 so that their slots bodies, made of metal, can be placed in the mechanism of the tablet computer 20, and the slots can be placed on the surface of the tablet computer 20. Therefore, radio waves generated by the slot antennas 22, 24, 26 and 28 radiate or diffract from the slots on the surface of the tablet computer 20. In addition, the sides of the slot can be part of the surface of the tablet computer 20. Since the slot bodies of the slot antennas 22, 24, 26 and 28 are made of metal, the radio waves generated by them radiate or diffract only from the slots 221 or 241, which creates no additional electromagnetic interference and no increased shielding costs. Moreover, the slots on the surface of the tablet computer 20 can be covered by a non-metallic material, such as plastic, to improve the appearance of the surface of the tablet computer.

The tablet computer 20 can be a notebook computer, a PDA (personal digital assistant), a cellular phone, a smart phone or other wireless communications device.

Although the present invention has been explained in relation to its preferred embodiment, it is to be understood that many other possible modifications and variations can be made without departing from the spirit and scope of the invention as hereinafter claimed.

What is claimed is:

1. A slot antenna for a portable wireless communication device comprising:

at least one metallic resonating chamber, having at least one first slot on at least one side;

at least one feeding wire, coupled on a side of the metal resonating chamber;

at least one excitation section, placed inside the metal resonating chamber and connected to the at least one feeding wire; and the portable wireless communication device having at least one second slot on at least one side;

wherein the metal resonant chamber is located in the portable wireless communication device and the at least one first slot is working with the at least one second slot, and wherein an internal surface of the metal resonating chamber is occupied with a material with a high dielectric constant.

2. The slot antenna as claimed in claim 1, wherein the at least one side with the at least one slot is a part of the at least one side of the portable wireless communications device.

3. The slot antenna as claimed in claim 1 wherein the slot antenna receives a communication signal via the feeding wire, and the metal resonating chamber generates a resonance resulting from the communication signal.

4. The slot antenna as claimed in claim 3, wherein the excitation section is no longer than one quarter the wavelength of the communication signal.

5. The slot antenna as claimed in claim 3, wherein the at least one first slot is no longer than one quarter of the wavelength of the communication signal.

6. The slot antenna as claimed in claim 1, wherein the excitation section is made of a metallic material.

7. The slot antenna as claimed in claim 1, wherein the excitation section is part of the feeding wire.

8. The slot antennas as claimed in claim 1, wherein the material with the high dielectric constant is a ceramic material.

9. The slot antenna as claimed in claim 1, wherein the at least one first slot further comprises at least one non-metallic material.

10. The slot antenna as claimed in claim 9, wherein the at least one non-metallic material is plastic.

11. The slot antenna as claimed in claim 1, wherein the portable wireless communication device is a table computer.

12. The slot antennas as claimed in claim 1, wherein the portable wireless communication device is a notebook.

13. The slot antenna as claimed in claim 1, wherein the portable wireless communication device is a PDA.

* * * * *